United States Patent
Johansson (10) Patent No.: US 9,369,460 B2
(45) Date of Patent: Jun. 14, 2016

(54) AUTHENTICATION MANAGER

(71) Applicant: Amazon Technologies, Inc., Reno, NV (US)

(72) Inventor: Jesper M. Johansson, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/323,779

(22) Filed: Jul. 3, 2014

(65) Prior Publication Data

US 2014/0325623 A1 Oct. 30, 2014

Related U.S. Application Data

(63) Continuation of application No. 12/539,886, filed on Aug. 12, 2009, now Pat. No. 8,776,214.

(51) Int. Cl.
*H04L 29/06* (2006.01)
*G06F 21/31* (2013.01)

(52) U.S. Cl.
CPC ........... *H04L 63/0823* (2013.01); *G06F 21/31* (2013.01); *H04L 63/08* (2013.01); *H04L 63/083* (2013.01); *G06F 2221/2119* (2013.01)

(58) Field of Classification Search
CPC ....... G06F 21/31; G06F 21/33; G06F 21/335; G06F 17/30; H04L 63/0823
See application file for complete search history.

(56) References Cited

U.S. PATENT DOCUMENTS

| 7,185,364 | B2 | 2/2007 | Knouse et al. | |
| 7,634,811 | B1 * | 12/2009 | Kienzle | G06F 21/33 726/22 |
| 2002/0093915 | A1 * | 7/2002 | Larson | H04L 63/0272 370/235 |
| 2005/0149854 | A1 | 7/2005 | Pennell et al. | |
| 2005/0177731 | A1 | 8/2005 | Torres et al. | |
| 2005/0183003 | A1 | 8/2005 | Peri | |
| 2005/0210254 | A1 * | 9/2005 | Gabryjelski | G06F 21/105 713/175 |
| 2006/0059434 | A1 | 3/2006 | Boss et al. | |
| 2007/0130327 | A1 | 6/2007 | Kuo et al. | |
| 2008/0071808 | A1 | 3/2008 | Hardt et al. | |
| 2008/0201575 | A1 * | 8/2008 | van der Rijn | H04L 9/321 713/156 |
| 2008/0263352 | A1 | 10/2008 | Krahn et al. | |
| 2009/0240936 | A1 | 9/2009 | Lambiase et al. | |
| 2010/0037303 | A1 | 2/2010 | Sharif et al. | |
| 2010/0217975 | A1 * | 8/2010 | Grajek et al. | 713/157 |
| 2010/0275024 | A1 | 10/2010 | Abdulhayoglu | |

OTHER PUBLICATIONS

PC Magazine—LastPass 1.50 Review & Rating—Mar. 20, 2009 http://www.pcmag.com/article2/0,2817,2343562,00.asp#fbid=rg3fbOOKZ4v.
KeePass Features—Nov. 9, 2008 http://web.archive.org/web/20081109040244/http://keepass.info/features.html.
Password Keychain 1.0.1.37—Mar. 28, 2006 http://www.softpedia.com/get/Security/Password-Managers-Generators/Password-Keychain.shtml.

(Continued)

*Primary Examiner* — Joseph P Hirl
*Assistant Examiner* — Thomas Gyorfi
(74) *Attorney, Agent, or Firm* — Thomas | Horstemeyer, LLP (57) ABSTRACT

Disclosed are various embodiments for an authentication manager. The authentication manager performs a certificate validation for a network site. If the certificate validation is successful, the authentication manager automatically provides a security credential to the network site.

20 Claims, 7 Drawing Sheets

(56) References Cited

OTHER PUBLICATIONS

Macworld Mac OS X Hints—10.4: Create strong and memorable passwords—May 2, 2005 http://hints.macworld.com/article.php?story=20050323104042259.

"MozillaZine: Security Error: Domain Name Mismatch or Server Certificate Expired" Article last modified Dec. 16, 2006 (observed by the Internet Archive on Jan. 10, 2007) (1 page) http://web.archive.org/web/20070110224337/http://kb.mozillazine.org/Security_Error%3A_Domain_Name_Mismatch_or_Server_Certificate_Expired.

"SSL Shopper: SSL Certificate Name Mismatch Error" Article posted Nov. 6, 2008 (observed by the Internet Archive on Dec. 10, 2008) (4 pages) http://web.archive.org/web/20081210144357/http://www.sslshoppercom/ssl-certificate-name-mismatch-error.html.

"KeePass Help Center: Password Generator" Article dated Jul. 30, 2008 as verified by the Internet Archive (4 pages) http://web.archive.org/web/20080730154305/http://keepass.info/help/base/pwgenerator.html.

"KeePass Help Center: Using Stored Passwords" Article dated May 16, 2008 as verified by the Internet Archive (1 page) http://web.archive.org/web/20080516075550/http://www.keepassinfo/help/base/usingpws.html.

"KeePass Help Center: Security" Article dated Jul. 26, 2008 as verified by the Internet Archive (4 pages) http://web.archive.org/web/20080726082133/http://keepassinfo/help/base/security.html.

"KeePass Help Center: Technical FAQ" Article dated Aug. 6, 2008 as verified by the Internet Archive (6 pages) http://web.archive.org/web/20080806090217/http://keepass.info/help/base/faq_tech.html.

"RoboForm User Manual (Print Version)" ©2000-2007 Siber Systems. (33 pages) http://web.archive.org/web/20071 014183247/http://www.roboform.com/manual-pr.pdf.

"RoboForm: Does RoboForm work in My Browser: AOL, MSN, Mozilla, Firefox, Netscape, Avant, MaxThon, NetCaptor, Slim, etc" Article dated Feb. 9, 2008 as verified by the Internet Archive (5 pages) http://web.archive.org/web/20080209121716/http://www.roboform.com/browsers.html#browser_mozilla.

Adam Pash. "Five Best Password Managers" Published Aug. 28, 2008 at lifehacker.com (©2008 Gawker Media Inc.) (3 pages) http://lifehacker.com/5042616/five-best-password-managers.

Adam Pash. "LastPass Autocompletes Logins and Forms in Chrome, iPhone" Published Jan. 20, 2009 at lifehacker.com.(©2009 Gawker Media Inc.) (2 pages) http://lifehacker.com/5135416/lastpass-autocompletes-logins-and-forms-in-chrome-iphone.

"Yahoo! Mail Registration" ©2005 Yahoo! Inc. [web page dated Sep. 20, 2005 by the Internet Archive] (2 pages) http://web.archive.org/web/20050920102232/http://edit.yahoo.com/config/eval_register?.intl=us&new=1&.done=&.src=ym&.V=0&.u=4sji0q8tcall6&.partner=&promo=&.last=.

"CNN Member Center Register Free" ©2005 Cable News Network LP, LLLP. (1 page) http://web.archive.org/web/20051108050554/http://audienee.enn.com/services/cnn/memberservices/member_register.jsp?pid=  &source=cnn&url=http%3A%2F%2Faudience.cnn.com%2Fservices%2Fcnn%2Fmember-services%2Fregwaii%2Fmember_profile.jsp%3Fsource%3Dcnn.

"LastPass Form Fill Demonstration" YouTube video uploaded Sep. 25, 2008 (2 pages) http://www.youtube.com/watch?v=bxz6jA8zuPA&feature=player_embedded.

"LastPass—Advanced Site Save and Autologin" YouTube video uploaded Jan. 6, 2009 (1 page) http://www.youtube.com/watch?v=VCEBi25wadM.

"SuperGenPass: A Free Bookmarklet Password Generator Frequently Asked Questions" Article dated Jul. 16, 2008 as verified by the Internet Archive (7 pages) http://web.archive.org/web/20080716161432/http://supergenpass.com/about/.

Exchange Server Forums "The SSL Certificate Server Name is incorrect" Forum posts from Aug. 24-25, 2005 (2 pages) http://forums.msexchange.org/m_160048900/mpage_1/key_/tm.htm#160048900.

Stack Overflow "Why do we trust SSL certificates?" Various forum posts on Feb. 25, 2009 (4 pages) http://stackoverflow.com/questions/585129/why-do-we-trust-ssl-certificates.

"mozilla.org: Using Privacy Features" ©1999-2008 Mozilla.org (obtained by the Examiner on Apr. 28, 2008) (23 pages) http://www.mozilla.org/projects/security/pki/psm/help21/using_privhelp.html.

Chad Perrin. "IT Security: Use the Firefox password manager" Published Aug. 4, 2009 by TechRepublic.com (4 pages) http://www.techrepublic.com/blog/security/use-the-firefox-password-manager/2089.

"dria.org Blog archive: Firefox 3: Password management" Article published May 15, 2008 (4 pages) http://www.dria.org/wordpress/archives/2008/05/15/639/.

Jake Edge. "Firefox 3 SSL certificate warnings" Published Aug. 27, 2008 (8 pages) http://lwn.net/Articles/295810/.

Kulvir Singh Bhogal. "Taking Firefox with You on the Road: Using a USB Thumb Drive" Published Jun. 2, 2006 (3 pages) http://www.informit.com/articles/printerfriendly.aspx?p=472692.

"Yahoo! Sign-in and Registration Help: How do I change my password?" Dated Jan. 26, 2005 by the Internet Archive (1 page) http://web.archive.org/web/20050126025602/http://help.yahoo.com/help/us/edit!edit-13.html.

"Yahoo! Sign-in and Registration Help: How do I sign up?" Dated Jan. 26, 2005 by the Internet Archive (1 page) http://web.archive.org/web/20050126021347/http://help.yahoo.com/help/us/edit!edit-01.html.

"P-Synch Installation and Administration Guide" Last updated Jun. 1, 2000. ©2000 M-Tech Inc. (385 pages).

Wikipedia article for "Password manager" Originally published Jul. 31, 2008 (2 pages) http://en.wikipedia.org/w/index.php?title=Password_manager&oldid=2291 03460.

T. Dierks et al. "RFC 2246: The TLS Protocol Version 1.0" ©1999 The Internet Society. (80 pages) http://www.rfc-editor.org/rfc/pdfrfc/rfc2246.txt.pdf.

Steve Gibson and Leo Laporte. "Security Now! Transcript of Episode #195: The SSL!TLS Protocol" Originally broadcast May 7, 2009 (22 pages) http://www.grc.com/sn/sn-195.pdf.

\* cited by examiner

AUTHENTICATION MANAGER

CROSS-REFERENCE TO RELATED APPLICATIONS

This application is a continuation of, and claims priority to, co-pending U.S. patent application entitled "AUTHENTICATION MANAGER" filed on Aug. 12, 2009 and assigned application Ser. No. 12/539,886, which is incorporated herein by reference in its entirety.

BACKGROUND

Many web sites require users to log in with a username and password so that the users may be securely identified. Users, however, often forget their username and/or password and/or specify the same username and/or password for multiple web sites. Managing tens or even hundreds of usernames and passwords is a major cause of pain for users and results in excessive abandonment rates where users simply fail to sign up for a new service if it requires a new account.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Many network sites, such as web sites, use passwords and/or usernames and passwords in order to authenticate user accounts. Although passwords may be a strong security credential when used properly, they are often misused. For example, a user may set a relatively weak password, such as a word from a dictionary or a password that is otherwise easy to guess. A user may also set the same password for multiple accounts across multiple network sites and with different security requirements. Thus, if one account is compromised, all other accounts using the same password are also vulnerable. Moreover, through a practice known as "phishing," a user may inadvertently provide a password to a fraudulent network site that resembles a legitimate network site.

Thus, many problems associated with using passwords as a security credential are caused by humans being unable to process the type of data that passwords represent. Good passwords are often random and long, which makes them hard to remember. Passwords are often not a single chunk of information and can stretch the limits of human working memory. The system disclosed herein largely separates the user from the password, thereby resolving many of the issues. For example, the system may automatically generate a unique, strong password for each network site, using characters selected from the entire set of characters acceptable by the network site. In ordinary use, the user may not need to know the password for the network site. Further, the system may be configured to verify the identity of a network site before providing a password to the network site, thereby thwarting most phishing schemes. In the following discussion, a general description of the system and its components is provided, followed by a discussion of the operation of the same.

Figure 1:
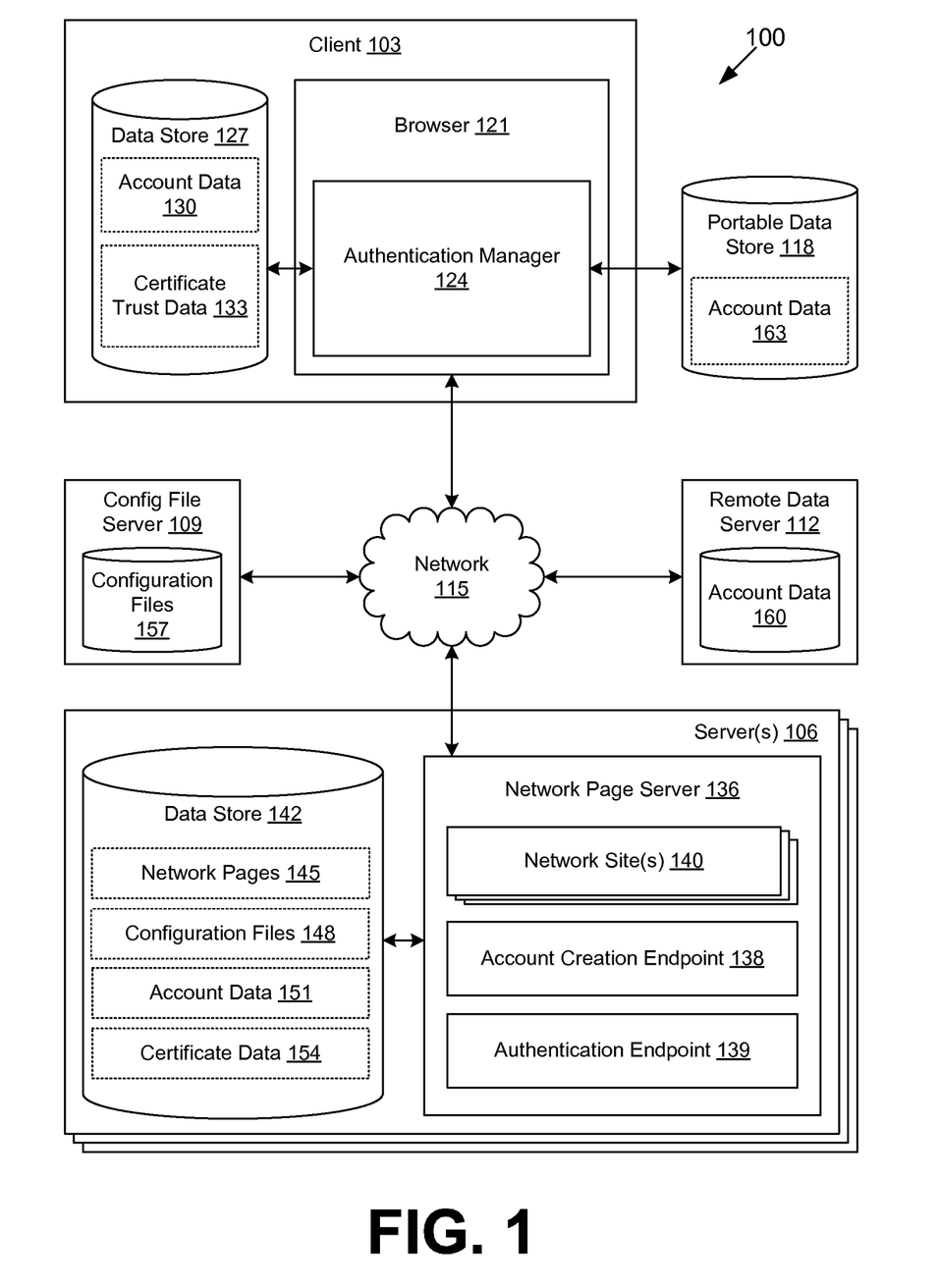
FIG. 1 is a drawing of a networked environment according to various embodiments of the present disclosure.

With reference to FIG. 1, shown is a networked environment 100 according to various embodiments of the present disclosure. The networked environment 100 includes a client 103 that may be in data communication with servers 106, configuration file server 109, and remote data server 112 by way of a network 115. The network 115 includes, for example, the Internet, intranets, extranets, wide area networks (WANs), local area networks (LANs), wired networks, wireless networks, or other suitable networks, etc., or any combination of two or more such networks. The client 103 may also be in data connection with a portable data store 118 by way of, for example, a local interface, data bus, or another network 115.

The client 103 may comprise, for example, a computer system such as a desktop, laptop, or other computer system. The client 103 may also comprise personal digital assistants, cellular telephones, set-top boxes, or other systems with like capability. Further, the client 103 may also comprise any device that is network capable that may communicate with the servers 106, 109, 112 over the network 115 to perform various functions. Such clients 103 may comprise, for example, processor-based devices having processor circuits comprising a processor and a memory.

The client 103 may be configured to execute various applications such as a browser 121, an authentication manager 124, and/or other applications. The browser 121 may be executed in a client 103, for example, to access and render network pages, such as web pages, or other network content served up by the server 106 and/or other servers. The authentication manager 124 may be executed to manage usernames, passwords, private and public keys, certificates, and/or other security credentials. In some embodiments, the authentication manager 124 runs as a plug-in application to the browser 121. In other embodiments, the authentication manager 124 may be a standalone application that interfaces with the browser 121 and/or other applications requiring management of authentication. The client 103 may be configured to execute applications beyond browser 121 and authentication manager 124 such as, for example, e-mail applications, instant message applications, and other applications.

The client 103 includes a data store 127, and potentially other data stores, which may comprise data and applications configured to provide access to the data. The data store 127 may be used to store account data 130, certificate trust data 133, and/or potentially other data. Account data 130 may include, for example, security credentials used to access various network sites or network pages, information regarding authentication endpoints, and/or other information. In various embodiments, account data 130 may be stored in an encrypted format. Certificate trust data 133 may describe trusted certificate authorities that issue digital certificates used by network sites. Certificate trust data 133 may comprise, for example, public keys associated with the trusted certificate authorities. The public keys may be used to validate the digital signature of a trusted certificate authority on a digital certificate.

The server 106 may comprise, for example, a server computer or like system. The server 106 may represent multiple servers arranged, for example, in one or more server banks or other arrangements. Such servers 106 may be located in a single installation or may be dispersed among many different geographical locations. For purposes of convenience, the server 106 is referred to herein in the singular. However, in one embodiment, the server 106 represents a plurality of servers arranged as described above.

The server 106 is configured to execute various applications such as, for example, a network page server 136, an account creation endpoint 138, an authentication endpoint 139, and other applications. The network page server 136 is configured to serve up network pages, such as web pages, and other files from the server 106 to various clients 103. The network page server 136 may be configured to send network pages by hypertext transfer protocol (HTTP), hypertext transfer protocol secure (HTTPS), or some other protocol. The network page server 136 may employ encryption using, for example, secure sockets layer (SSL), transport layer security (TLS), and/or some other method. Non-limiting examples of network page servers 136 include Apache™ HTTP Server, Microsoft® Internet Information Services, and other server applications.

The network page server 136 may be configured to serve up one or more network sites 140. Such a network site 140 is said to be hosted by the network page server 136. A network site 140 may include a set of network pages and/or files associated with a domain name, such as a canonical name, and a directory, such as a root directory (i.e., "/") or some other directory. Each network site 140 may be associated with distinct configuration settings in the network page server 136, while other default configuration settings may be shared across network sites 140.

The account creation endpoint 138 may comprise a network page and/or software configured to facilitate creation of one or more accounts for one or more users at a client 103 for one or more network sites 140. In various embodiments, the authentication manager 124 communicates with the account creation endpoint 138 through the network page server 136. To this end, the account creation endpoint 138 may be a plug-in or other module of the network page server 136, a script or other software embedded within a network page or otherwise within a network site 140 and executed by way of an interpreter or a common gateway interface, or accessed in some other way through the network page server 136. In other embodiments, the account creation endpoint 138 may be a server application executing on the same or a different server 106 as the network page server 136.

The authentication endpoint 139 may comprise a network page and/or software configured to facilitate authentication of a user at a client 103 for one or more network sites 140. In various embodiments, the authentication manager 124 communicates with the authentication endpoint 139 through the network page server 136. To this end, the authentication endpoint 139 may be a plug-in or other module of the network page server 136, a script or other software embedded within a network page or otherwise within a network site 140 and executed by way of an interpreter or a common gateway interface, or accessed in some other way through the network page server 136. In other embodiments, the authentication endpoint 139 may be a server application executing on the same or a different server 106 as the network page server 136.

The server 106 includes a data store 142 and potentially other data stores, which may comprise data and applications configured to provide access to the data. The data store 142 may be used to store network pages 145, configuration files 148, account data 151, certificate data 154, and/or potentially other data. Network pages 145 may include the network pages and/or files served up for the network sites 140 hosted by the network page server 136. Configuration files 148 may include one or more security credential specifications and/or describe an interface of one or more account creation endpoints 138 and/or authentication endpoints 139. Account data 151 comprises security credentials and/or other data associated with users of one or more network sites 140. Certificate data 154 comprises digital certificates that may be used by the network page server 136, the authentication endpoint 139, and/or other applications on the server 106 to identify a network site and/or encrypt data.

The configuration file server 109 may comprise, for example, a server computer or like system. The configuration file server 109 may represent multiple servers arranged, for example, in one or more server banks or other arrangements. Such configuration file servers 109 may be located in a single installation or may be dispersed among many different geographical locations. For purposes of convenience, the configuration file server 109 is referred to herein in the singular. However, in one embodiment, the configuration file server 109 represents a plurality of servers arranged as described above.

The configuration file server 109 includes a data store used to store configuration files 157 and potentially other data. The configuration files 157 may include one or more security credential specifications and/or describe an interface of one or more account creation endpoints 138 and/or authentication endpoints 139. The configuration file server 109 may be, for example, a system configured to provide configuration files 157 corresponding to a plurality of servers 106. The configuration file server 109 may be operated, in some cases, by a third party. In some embodiments, configuration files 157 may correspond to configuration files 148 stored on a server 106.

The remote data server 112 may comprise, for example, a server computer or like system. The remote data server 112 may represent multiple servers arranged, for example, in one or more server banks or other arrangements. Such remote data servers 112 may be located in a single installation or may be dispersed among many different geographical locations. For purposes of convenience, the remote data server 112 is referred to herein in the singular. However, in one embodiment, the remote data server 112 represents a plurality of servers arranged as described above.

The remote data server 112 includes a data store used to store account data 160 and potentially other data. The account data 160 may include, for example, security credentials used to access various network sites 140 or network pages 145, or to track user context across such network sites 140 or network pages 145; information regarding authentication endpoints; and/or other information. In various embodiments, account data 160 may be stored in an encrypted format. The account data 160 may be, for example, a mirror of account data 130 for one or more users.

The portable data store 118 may comprise, for example, a universal serial bus (USB) flash storage device, a solid-state storage device, a portable hard disk, a floppy disk, an optical disc, and/or other portable storage devices. In various embodiments, the portable data store 118 may include a processor circuit comprising a processor and a memory. In other embodiments, the portable data store 118 may merely consist of a storage medium. The portable data store 118 may be removably attached to the client 103 in some embodiments.

The portable data store 118 may be configured to store account data 163. The account data 163 may include, for example, security credentials used to access various network sites 140 or network pages 145, information regarding authentication endpoints 139, and/or other information. In various embodiments, the account data 163 may be a mirror of the account data 130. In other embodiments, the account data 163 may take the place of account data 130. The account data 163 may be stored in an encrypted format. To this end, the portable data store 118 may include a device (e.g., a fingerprint scanner or other biometric recognition device, a pin pad, etc.) used to authenticate a user in order to provide access to the data on the portable data store 118, such as account data 163; or it may include hardware and/or software to permit a user to enter a password and/or decryption key in order to provide access to the data on the portable data store 118. Additionally, in some embodiments, the authentication manager 124 may be stored on the portable data store 118 and executed in the client 103, for example, when the portable data store 118 is attached to the client 103.

Next, a general description of the operation of the various components of the networked environment 100 is provided. To begin, a user may install authentication manager 124 onto the client 103 and preconfigure the operation of the authentication manager 124 for existing accounts associated with network sites 140. For example, the user may provide to the authentication manager 124 existing security credentials such as, for example, usernames, passwords, security keys, certificates, and/or other security credentials along with identifying information for the network sites 140 and/or uniform resource locators (URLs) associated with the security credentials. The user may also configure a security credential such as, for example, a username, password, biometric identification, etc. for the authentication manager 124 so that the security credentials may be encrypted or otherwise protected from use or view on client 103 without the authorization of the user.

The account information may be stored by the authentication manager 124 in account data 130 on the client 103 and/or at some other location. For example, the authentication manager 124 may back up the account information to account data 160 located on the remote data server 106, account data 163 located on in the portable data store 118, and/or another location. In some embodiments, the authentication manager 124 may not store the account information on the client 103 at all and may only use other locations. When the portable data store 118 or the remote data server 112 are used to store account information, a user may be able to use the authentication manager 124 and the account information on another client 103. To this end, the authentication manager 124 may be, for example, downloaded, configured, and loaded automatically on another client 103.

Security credentials may be shared among multiple users of the authentication manager 124. As a non-limiting example, several users in an organization may share an online banking account. A first user may create a username and password for the account using the authentication manager 124. The first user may mark the account as shared and provide a list of users that are authorized to access the account, including a second user. When the account is distributed to account data 130, 160, it is secured such that only the authorized users can access it. When the second user next uses the authentication manager 124, the second user may be given the opportunity to synchronize the new account with account data 163 located in the portable data store 118 belonging to the second user or in some other location.

During the installation process, in one embodiment, the user may specify whether the authentication manager 124 is to operate as a browser 121 plug-in or as a standalone application. The authentication manager 124 may be installed and configured for a plurality of browsers 121 such as Firefox®, Internet Explorer®, Safari®, and/or other browsers 121. The authentication manager 124 may also be configured for a plurality of users on the client 103.

When a user accesses a network site 140 with the browser 121 or another application, the authentication manager 124 determines whether the network site 140 is associated with stored account information. If the network site 140 is not associated with stored account information, then the authentication manager 124 may notify the user and may prompt the user to provide security credentials if the user has an existing account. The user-provided security credentials may then be stored by the authentication manager 124 in one or more of account data 130, 160, 167.

Alternatively, or additionally, the authentication manager 124 may assist the user in creating an account for the network site 140. The account may be a one-time account, a first account for the user, or a second or subsequent account for the user. The authentication manager 124 may determine how to create an account for a network site 140 based, for example, on the structure of a form embedded within a network page 145. Such a form may be defined in hypertext markup language (HTML), extensible markup language (XML), or some other language.

As a non-limiting example, the authentication manager 124 may identify an account creation form when a submit input element on a network page 145 is associated with text such as "Create Account." The authentication manager 124 may also examine the URL for relevant keywords. As another non-limiting example, the authentication manager 124 may identify an account creation form when a challenge response test (e.g., a "Captcha") is present. The authentication manager 124 may automatically identify required fields for security credentials using, for example, input elements on a network page 145 named "username," "password," or other identifiable names. In various embodiments, the authentication manager 124 may have the user identify the account creation form and/or tag input elements of the form so that the authentication manager 124 may accurately identify how the account may be created with form filling. Such a list of tags can be stored in a configuration file 157 which may then be uploaded to a configuration file server 109. There, the configuration file 157 can be accessed by other users using the authentication manager 124 and used by them to simplify account creation on the network site 140 described by the configuration file 157.

In various embodiments, the authentication manager 124 may create the account in an automated way through methods other than form filling. For example, the authentication manager 124 may obtain a configuration file 148 associated with the network site 140 from either the network page server 136 for the network site 140 or a configuration file server 109 that may provide a configuration file 157 associated with the network site 140. The configuration file 148, 157 may define one or more account creation endpoints 138 for the network site 140 where the authentication manager 124 may authenticate and/or create an account other than by filling out a form. For example, the configuration file 148, 157 may define the URL, parameters, encoding, and/or other information required to create an account in an automated way through an account creation endpoint 138. In some embodiments, one account creation endpoint 138 may be shared by multiple network sites 140 and/or network page servers 136.

The configuration file 148, 157 may also include a security credential specification associated with the network site 140. The security credential specification may specify a character set, minimum length, maximum length, and/or other parameters for usernames and/or passwords. The security credential specification may also specify minimum key length, acceptable algorithms and formats, and/or other parameters applicable to public key infrastructure or other types of security credentials. The authentication manager 124 may generate one or more security credentials based on the security credential specification.

When the authentication manager 124 is creating an account by form filling, the authentication manager 124 may prompt the user to supply a security credential specification so that the authentication manager 124 may generate one or more security credentials to be filled in on the form. The user may see information regarding required attributes for security credentials displayed on the network page 145 near the account creation form. The authentication manager 124 may provide options including, but not limited to, length of the security credential, directions to use a certain character set, directions to use at least one number, directions to use at least one non-alphanumeric character, and other options. As a non-limiting example, the authentication manager 124 may present a graphical interface to the user listing various attributes that may be used in generating the security credentials. Such a graphical interface may include, for example, checkboxes, radio buttons, drop-down boxes, text fields, text areas, etc. The graphical interface may be preconfigured with default selections.

In various embodiments, when the authentication manager 124 is creating an account by form filling, the authentication manager 124 may replace, for example, the normal user interaction in filling out the form with a wizard interface. The wizard interface may omit tasks or fields that may be done automatically by the authentication manager 124. However, the wizard interface may obtain input from the user in order to fill out fields such as "Captchas" and other challenge response tests. Although the authentication manager 124 may be configured to fill out fields pertaining to other personal information (e.g., name, date of birth, social security number, phone number, address, etc.), the authentication manager 124 may instead be configured to prompt the user for that information. In various embodiments, the authentication manager 124 may leave unrecognized form fields blank for the user to complete.

Accordingly, the authentication manager 124 and/or browser 121 sends an account creation request associated with the generated security credential to the network site 140. After the account creation request is submitted, the account will either be created or not created for the network site 140. The network site 140 typically provides a response page indicating whether the account creation was successful. Such a network page 145 may be parsed automatically by the authentication manager 124 or may be left for additional user input to the authentication manager 124.

In some cases, the response page will include another form with an indication that there was a problem. As a non-limiting example, a username field may be highlighted with an explanation that the specified username was already taken. The authentication manager 124 may be configured to respond automatically to such requests and/or to seek user input. Account creation responses through an authentication endpoint 139 may be handled by the authentication manager 124 in an analogous way. In one embodiment, the authentication manager 124 may simply assume that the account was created.

Responsive to account creation, the authentication manager 124 stores the account information including, but not limited to, security credentials, URLs, and domain names associated with the account and network site 140, in one or more of account data 130, 160, 163. In particular, the network site 140 or authentication endpoint 139 may present a trusted certificate from certificate data 154 during the account creation process. Information relating to this trusted certificate, including domain name, certificate authority, and other information from the certificate, may be stored with the account information. The account information may consequently be marked as usable on a network site 140 corresponding to the domain name provided in the trusted certificate, or only for a network site 140 able to present that specific certificate in higher assurance environments. Account information stored in any of account data 130, 160, 163 may be manually or automatically copied by the authentication manager 124 to any other account data 130, 160, 163 so that the account information may be mirrored across any two or more of account data 130, 160, 163.

For purposes of backup, the authentication manager 124 may be capable of rendering a list of the stored account information in account data 130, 160, 163 for viewing or printing. To facilitate viewing or printing, the authentication manager 124 may be configured to generate human readable or printable security credentials using an appropriate character set. Alternatively, the authentication manager 124 may encode security credentials in a printable form using an encoding approach such as, for example, UUencoding, BinHex, Multipurpose Internet Mail Extensions (MIME) encodings, Base64, and other encoding approaches.

When a stored account exists for a network site 140, the authentication manager 124 determines whether to provide the security credentials to the network site 140. As a preliminary matter, the authentication manager 124 may require that the user be authenticated to the authentication manager 124 by way of a master security credential such as a password, presence of the portable data store 118 at the client 103, biometric identification, native operating system identification, or some other authentication. Responsive to authentication, the authentication manager 124 may decrypt the stored account data 130, 160, 163. In some embodiments, the authentication manager 124 may be given access to the stored account data 130, 160, 163 responsive to providing a master security credential. The authentication manager 124 then verifies the identity of the network site 140.

Verifying the identity of the network site 140 may be performed, for example, by comparing a domain name associated with a trusted certificate provided by a network site 140 at the time of logon with the domain name associated with the network site 140 in the stored account information. The authentication manager 124 may compare the domain name associated with the trusted certificate provided by the network site 140, for example, with a domain name provided by a user, a domain name inferred by heuristic analysis, or some other domain name, in order to identify which stored account the network site 140 appears to resemble. Verifying the identity of the network site 140 through the use of trusted certificates may be less susceptible to spoofing attacks than by verifying the identity merely through domain name service (DNS) name resolution, for example, or comparing a stored domain name to what is displayed in the address bar of the browser 121.

If the network site 140 provides no certificate (e.g., authentication under HTTP) or if the certificate is not trusted (e.g., self-signed or issued by a certificate authority not considered to be trusted in the certificate trust data 133), the authentication manager 124 may display a warning to the user. In some cases, the user may accept the warning and continue. In some embodiments, the authentication manager 124 may remember such characteristics and use them to aid in future identity verification of the network site 140. In other cases, the authentication manager 124 may identify a clear use of a spoofing attack or other phishing attempt and provide additional warnings, disable authentication at the particular network site 140, require reauthentication by the user to the authentication manager 124, and/or take other precautions. Additionally, by integrating the authentication manager 124 with a site providing reputation data for network sites 140 the authentication manager 124 can warn the user that a network site 140 is hostile.

The authentication manager 124 may additionally verify the identity of the network site 140 by other methods. One verification method may comprise comparing the contents of the address bar in the browser 121 with a stored URL or domain name. A second verification method may comprise comparing contents of the HTTP headers sent by the accessed network site 140 with a stored URL or domain name. A third verification method may comprise performing a reverse DNS look-up on an Internet Protocol (IP) address associated with the accessed network site 140 and comparing that domain name with a stored URL or domain name. Other verification methods may also be employed. More secure methods may be employed prior to downgrading to less secure methods, and the user may specify acceptable methods of proving the identity of network sites 140.

Once the identity of a network site 140 is verified, the authentication manager 124 may provide the security credentials to the network site 140 automatically through an authentication endpoint 139 or may obtain user confirmation. If the authentication manager 124 is configured to obtain user input, the authentication manager 124 may render a button or other user interface feature in or on top of the browser 121 to obtain confirmation.

When no authentication endpoint 139 is defined for a network site 140, the authentication manager 124 may be configured to detect whether an authentication form is presented. The authentication manager 124 may examine the network page 145 for elements such as a submit input element associated with text such as "Log In," input fields matching "username" and/or "password," fields using the password type, and other identifying elements. The authentication manager 124 may also examine the URL for relevant keywords. In some embodiments, the authentication manager 124 may store a URL associated with the network site 140 in account data 130, 160, 163 which may be used for authentication. The authentication manager 124 may provide the security credentials to the network site 140 by form filling. The submission of such a form may be automatic or may be subject to user input such as selection of a "Submit" or "Log In" button or other user interface element.

Figure 2:
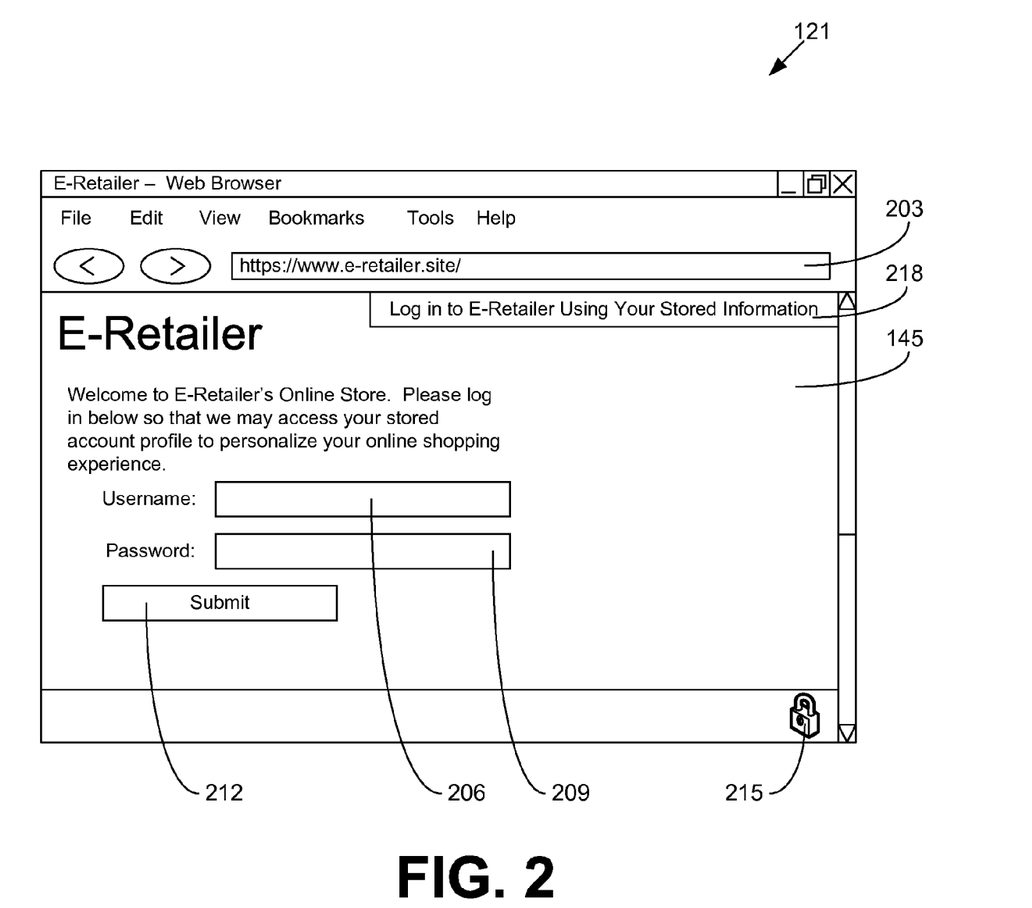
FIGS. 2-4 depict examples of network pages rendered by a browser executed in a client in the networked environment of FIG. 1 according to various embodiments of the present disclosure.

Turning now to FIG. 2, shown is an example of a network page 145 (FIG. 1) rendered by a browser 121 (FIG. 1) executed in a client 103 (FIG. 1) in the networked environment 100 (FIG. 1) according to various embodiments of the present disclosure. In this example, the user may have entered, or may have been automatically redirected to, the URL "https://www.e-retailer.site/," which is displayed in the address bar 203 of the browser 121. The network page 145 provided by the network site 140 (FIG. 1) in response to the URL includes an authentication form having a username field 206, a password field 209, and a submit button 212.

The browser 121 includes a security indication 215 that indicates that the network site 140 has presented a trusted certificate and the communication between the client 103 and the server 106 (FIG. 1) is being encrypted. In FIG. 2, the authentication manager 124 (FIG. 1) has verified the identity of the network site 140 and is presenting an authentication button 218. The authentication button 218 indicates that account information associated with the network site 140 is stored in account data 130, 160, 163.

Once a user selects the authentication button 218, the authentication manager 124 may fill in the username field 206 and the password field 209. The authentication manager 124 may also automatically submit the logon request by programmatically pressing the submit button 212. In some embodiments, the username field 206 and password field 209 may be prefilled automatically with the security credential upon verification of the identity of the network site 140. The security credentials may be shown as place holding characters or as plain text. Alternatively, if, for example, an authentication endpoint 139 (FIG. 1) is defined, the authentication manager 124 may authenticate in the background. In such a case, the authentication manager 124 may give an indication of success or failure and may provide another authentication button 218 in order to log out of the network site 140. If multiple user accounts are present for the network site 140, the authentication manager 124 may provide a drop-down box or other user interface element allowing the user to select one of the accounts for authentication.

Figure 3:
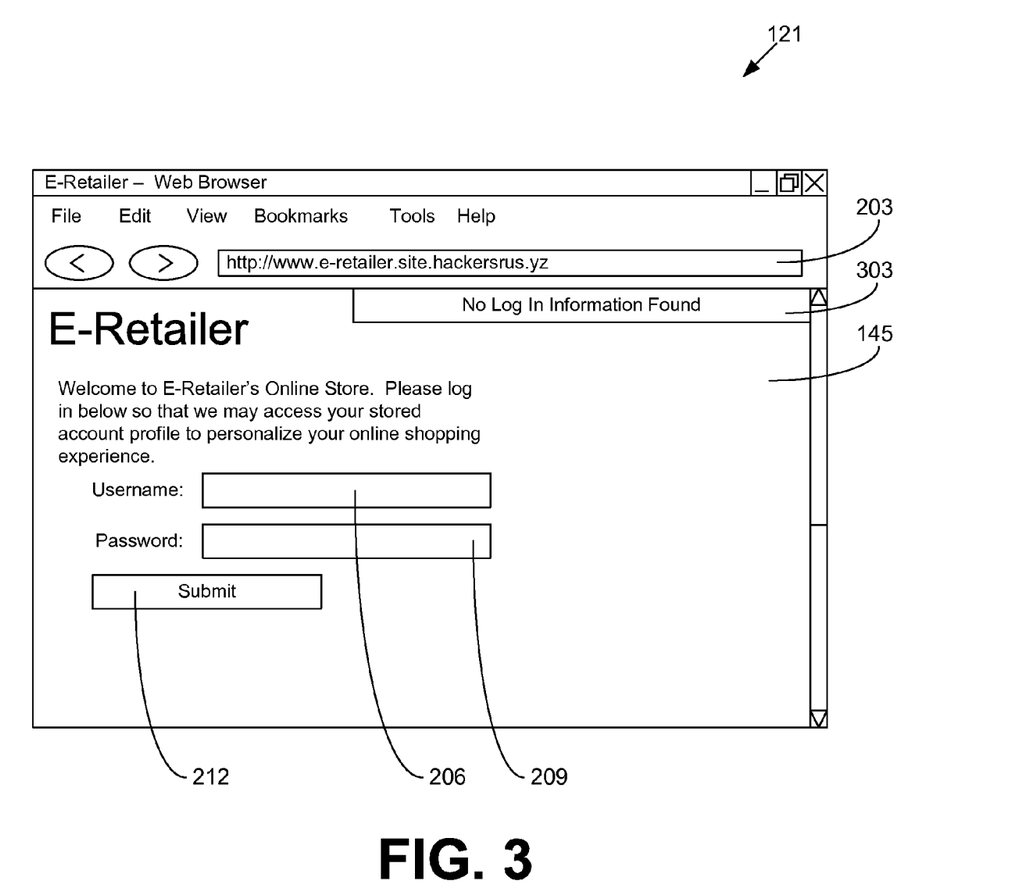

Referring next to FIG. 3, shown is another example of a network page 145 (FIG. 1) rendered by a browser 121 (FIG. 1) executed in a client 103 (FIG. 1) in the networked environment 100 (FIG. 1) according to various embodiments of the present disclosure. In this example, the user may have entered, or may have been automatically redirected to, a different URL such as "https://www.e-retailer.site.hackersrus.yz/," which is displayed in the address bar 203 (FIG. 2) of the browser 121. The network page 145 provided by the network site 140 (FIG. 1) in response to the URL includes an authentication form having a username field 206 (FIG. 2), a password field 209 (FIG. 2), and a submit button 212 (FIG. 2).

FIG. 3 represents an example of a common phishing scheme, where a network page 145 is presented by a fraudulent network site 140 having a look-and-feel that is identical or nearly identical to the network page 145 presented by the legitimate network site 140. See FIG. 2. Although the URL in this example includes the domain name of the legitimate network site 140, the URL is not identical and is in fact a subdomain of "hackersrus.yz." In this case, the authentication manager 124 (FIG. 1) cannot verify the identity of the network site 140 by way of the URL presented in the address bar 203 because the domain name in the URL is not a subdomain of, or identical to, the stored domain name "e-retailer.site" or "www.e-retailer.site."

The network site 140 in FIG. 3 cannot be identified additionally because the network site 140 has not presented a trusted certificate as the security indication 215 (FIG. 2) is absent. Various phishing attacks may involve presenting a trusted certificate associated with the name of some other network site 140 or a real certificate for the fraudulent network site 140. Other phishing attacks may involve substituting a security indication 215 that is faked. The authentication manager 124 may avoid such attacks because it is not deceived by graphical appearances but instead may examine the network page 145 and certificate data received behind the scenes by the browser 121. The authentication manager 124 determines that this network site 140 in FIG. 3 has no stored security credentials. Thus, in this non-limiting example, the authentication manager 124 presents an information button 303 in place of an authentication button 218 (FIG. 2) that states "No Log In Information Found."

In some embodiments, the authentication manager 124 may employ a heuristic analysis of the network page 145 and/or reputation data to identify fraudulent sites proactively. For example, the authentication manager 124 may perform a heuristic analysis to determine whether a network page includes a logon form that is a fraudulent copy of a logon form associated with a stored domain name. In such cases, the authentication manager 124 may provide a warning to the user. Additionally, if the user were to request that the authentication manager 124 provide the security credentials used for a legitimate network site 140 to a fraudulent network site 140 (e.g., if the domain name of a trusted certificate of the fraudulent network site 140 does not match the stored domain name associated with the legitimate network site 140), the authentication manager 124 may generate a warning.

Figure 4:
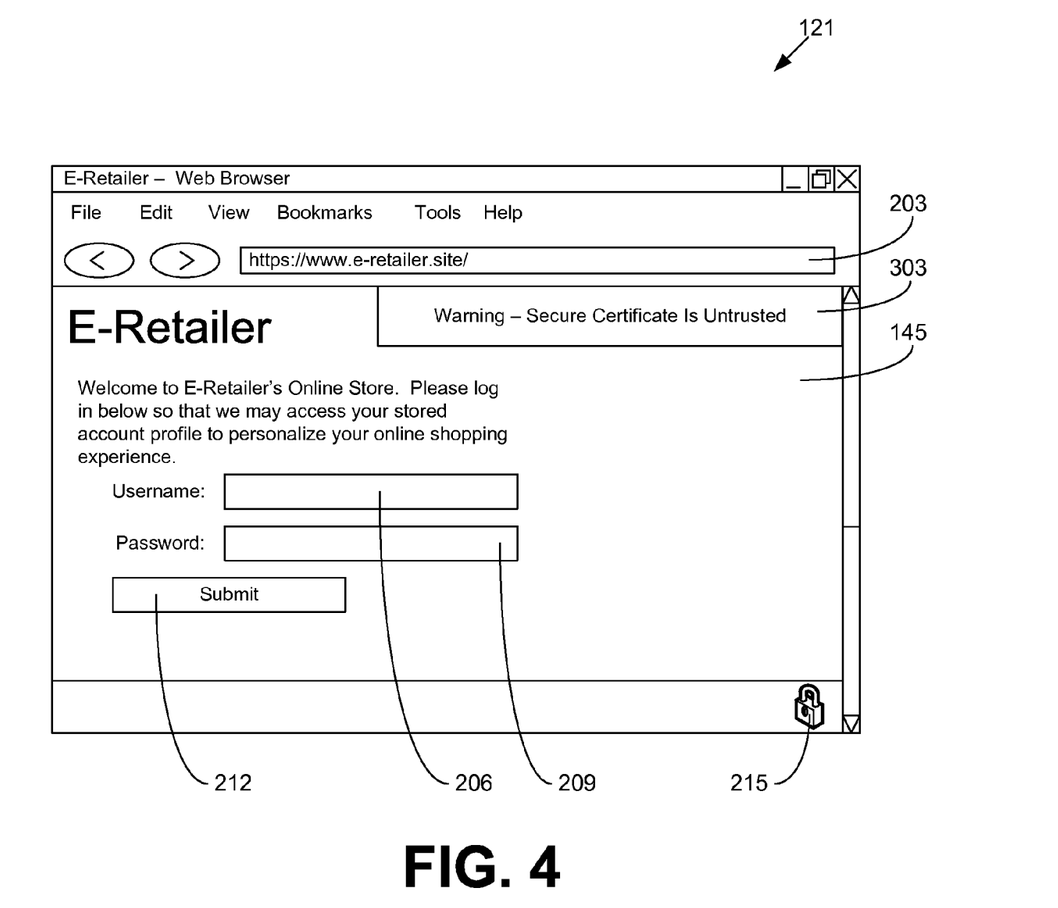

Moving on to FIG. 4, shown is an example of a network page 145 (FIG. 1) rendered by a browser 121 (FIG. 1) executed in a client 103 (FIG. 1) in the networked environment 100 (FIG. 1) according to various embodiments of the present disclosure. In this example, the browser 121 appears identical to that depicted in FIG. 2, except that the authentication manager 124 (FIG. 1) has provided an information button 303 (FIG. 3) in place of an authentication button 218 (FIG. 2). The address bar 203 (FIG. 2) appears to depict the URL of the legitimate network site 140 (FIG. 1). However, the secure certificate was issued by an untrusted certificate authority.

The inconsistency may be explained by spoofing attacks according to various methods such as, for example, a man-in-the-middle attack and other attacks. As a non-limiting example, the client 103 may have been provided misbehaving and/or compromised DNS servers through the dynamic host configuration protocol (DHCP). The misbehaving DNS servers may be configured to give inaccurate domain name information. By contrast, malicious users are less likely to be able to compromise a trusted certificate authority because public key infrastructure is used. Here, the authentication manager 124 has determined that a network site 140 is not verified and has not provided the security credentials. An ordinary user, however, may have been misled and supplied the security credentials to the fraudulent network site 140.

In some cases, the inconsistency may result from a legitimate network site 140 changing its certificate provider. The authentication manager 124 may include a configuration setting to enable a warning when the certificate authority signing the secure certificate for a network site 140 changes from the certificate authority that issued the secure certificate that the authentication manager 124 received when the security credential was previously created or stored for the network site 140.

Figure 5:
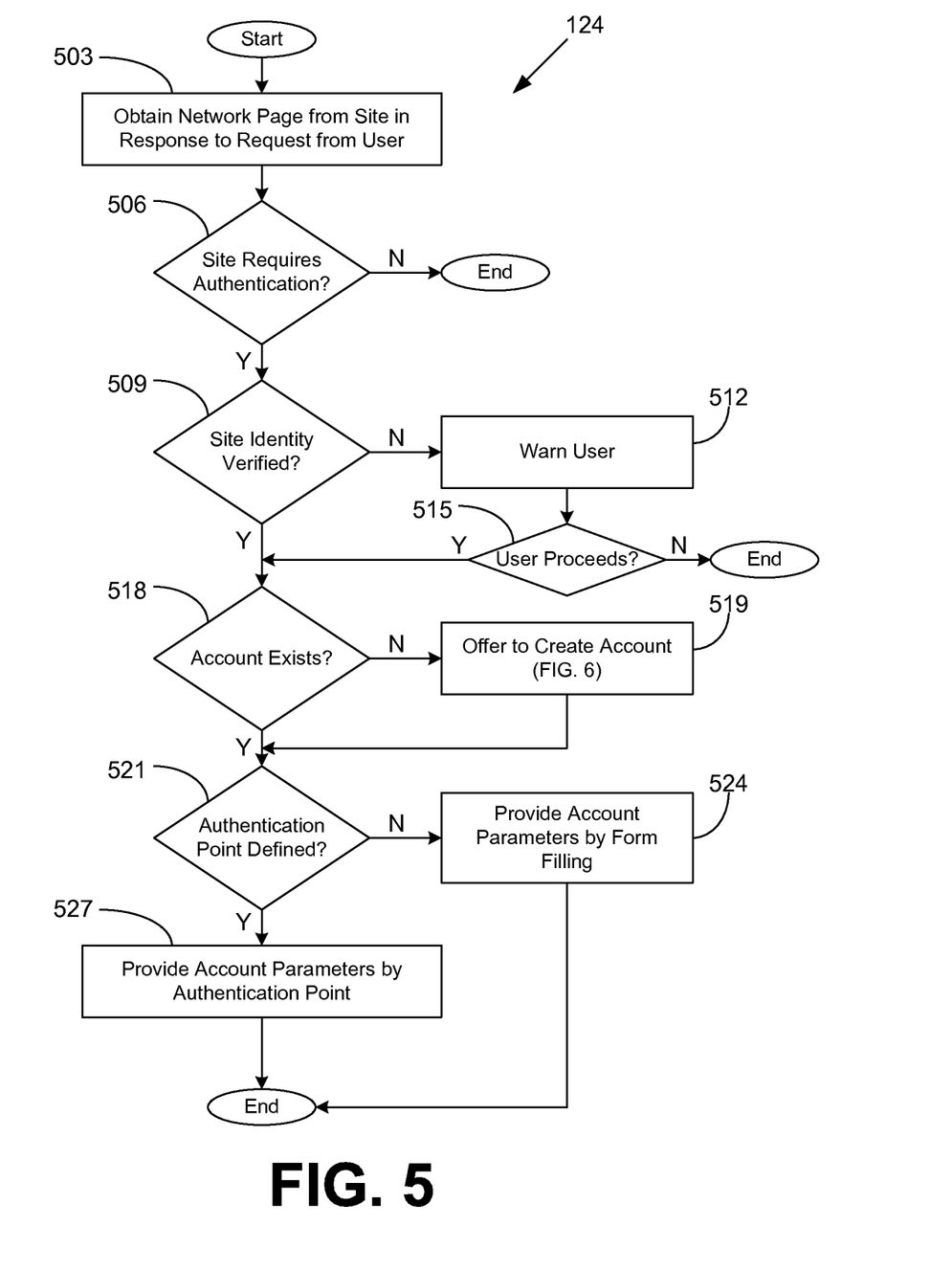
FIGS. 5 and 6 are flowcharts illustrating examples of functionality implemented as portions of an authentication manager executed in a server in the networked environment of FIG. 1 according to various embodiments of the present disclosure.

With reference to FIG. 5, shown is a flowchart that provides one example of the operation of a portion of the authentication manager 124 (FIG. 1) according to various embodiments. It is understood that the flowchart of FIG. 5 provides merely an example of the many different types of functional arrangements that may be employed to implement the operation of the portion of the authentication manager 124 as described herein. As an alternative, the flowchart of FIG. 5 may be viewed as depicting an example of steps of a method implemented in the client 103 (FIG. 1) according to one or more embodiments.

Beginning with box 503, the authentication manager 124 obtains a network page 145 (FIG. 1) from a network site 140 (FIG. 1) in response to a request by a user. In various embodiments, the network page 145 may be obtained through operation of the browser 121 (FIG. 1). Next, in box 506, the authentication manager 124 determines whether the network site 140 requires authentication. This determination may be based, for example, on the presence of an authentication form on the network page 145 or some other network page 145 on the network site 140, the presence of a configuration file 148, 157 (FIG. 1), on user input, or on other factors. If authentication is not required by the network site 140, the control flow of the authentication manager 124 stops.

After determining that a network site 140 requires authentication, the authentication manager 124 proceeds to box 509. In box 509, the authentication manager 124 determines whether the identity of the network site 140 can be verified. This verification may involve, for example, examination of a domain name associated with a trusted certificate received in connection with the network page 145.

If the authentication manager 124 cannot verify the identity of the network site 140, the authentication manager 124 moves to box 512 and warns the user that the identity of the site cannot be verified and/or notifies the user that no stored account information can be found. Next, the authentication manager 124 determines in box 515 whether the user has indicated to proceed with authentication nonetheless using other stored account information. In some embodiments, the authentication manager 124 may preclude the user from proceeding with authentication. If the user has not indicated to proceed, the control flow of the authentication manager 124 stops. If the user has indicated to proceed in box 515, the authentication manager 124 moves to box 518. If in box 509 the identity of the network site 140 has been verified, the authentication manager 124 moves also to box 518.

In box 518, the authentication manager 124 determines whether an account exists in account data 130, 160, 163 (FIG. 1) for the network site 140. This determination may be made by comparing the domain name associated with the request with stored domain names in account data 130, 160, 163. Additionally, the user may provide a domain name to the authentication manager 124 which the user believes to correspond to the network site 140 in order to locate a stored account. If the authentication manager 124 determines that an account does not exist, the authentication manager 124 proceeds to box 519 and offers to create an account for the user. Account creation is covered in more detail by the flowchart of FIG. 6. Moreover, additional accounts for a same network site 140 may be created by the authentication manager 124 in response to user input.

Next, in box 521, the authentication manager 124 determines whether an authentication endpoint 139 (FIG. 1) has been defined for the network page 145 or network site 140. This may involve examining, if they exist, configuration files 148, 157 (FIG. 1). If an authentication endpoint 139 has not been defined, the authentication manager 124 moves to box 524 and provides the account parameters, including security credentials, by form filling. The authentication manager 124 may send the account parameters to the network site 140 or may merely allow the user to submit the form. The control flow of the authentication manager 124 then stops.

If in box 521 the authentication manager 124 determines that an authentication endpoint 139 has been defined, the authentication manager 124 proceeds to box 527 and provides the account parameters by way of the authentication endpoint 139. The authentication manager 124 may send the account parameters to the network site 140 or wait for user input for approval. The control flow of the authentication manager 124 then stops.

Figure 6:
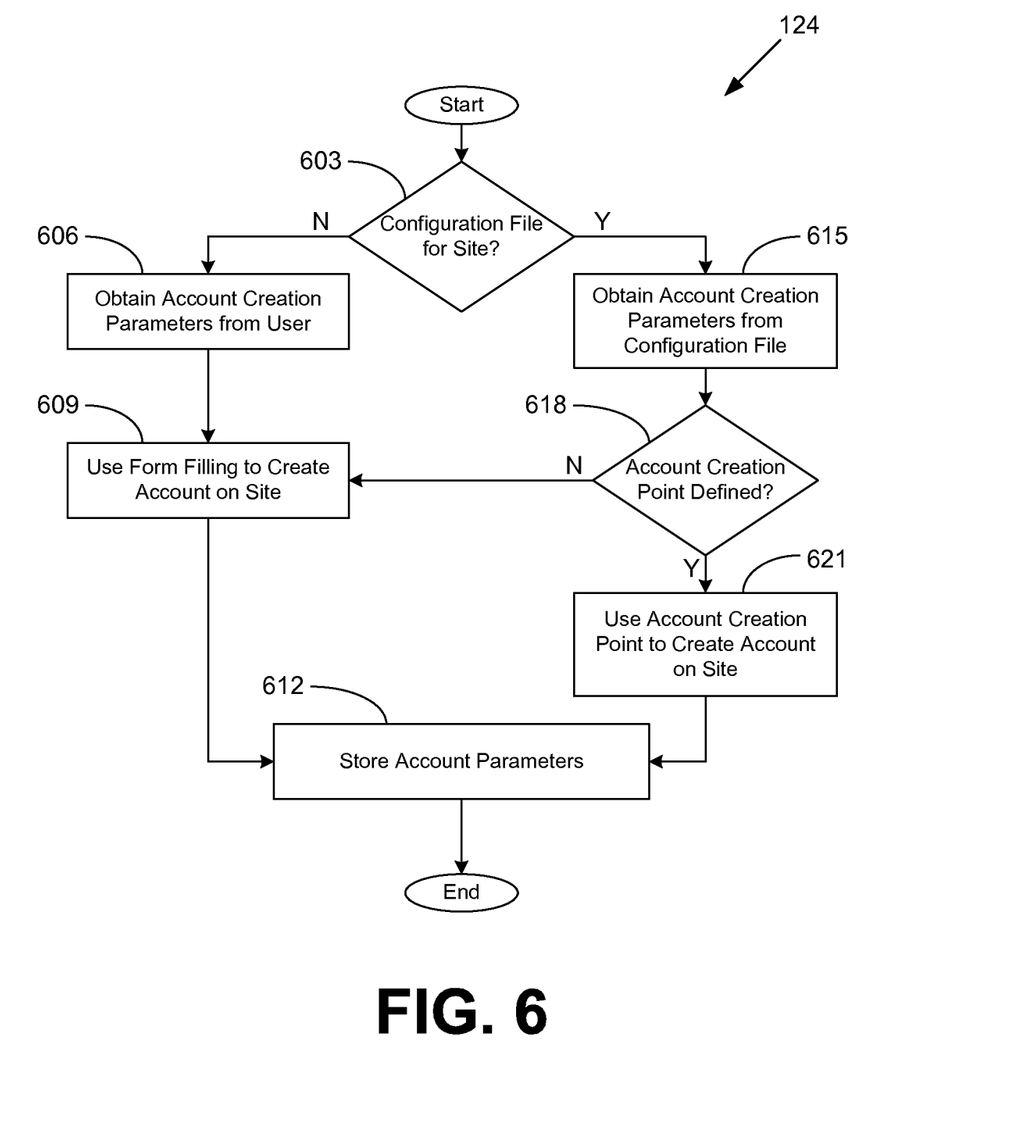

Turning now to FIG. 6, shown is a flowchart that provides one example of the operation of another portion of the authentication manager 124 (FIG. 1) according to various embodiments. It is understood that the flowchart of FIG. 6 provides merely an example of the many different types of functional arrangements that may be employed to implement the operation of the portion of the authentication manager 124 as described herein. As an alternative, the flowchart of FIG. 6 may be viewed as depicting an example of steps of a method implemented in the client 103 (FIG. 1) according to one or more embodiments.

Beginning with box 603, the authentication manager 124 determines whether there is a configuration file 148, 157 (FIG. 1) for the network site 140 (FIG. 1). If there is not, the authentication manager 124 moves to box 606 and obtains account creation parameters from the user. The parameters may relate, for example, to length of a password, permissible characters, required characters, etc.

Then, in box 609, the authentication manager 124 uses form filling to create the account on the network site 140. User input may be necessary to submit the form in some embodiments, or the account creation request may be submitted automatically. If the account creation request results in failure, the authentication manager 124 may return to box 606 or leave the account creation up to the user. Next, in box 612, the authentication manager 124 stores account parameters in one or more of account data 130, 160, 163 (FIG. 1). The control flow of the authentication manager 124 then stops.

If the authentication manager 124 determines in box 603 that a configuration file 148, 157 exists for the network site 140, the authentication manager 124 moves to box 615 and obtains account creation parameters from a configuration file 148, 157. Then, in box 618, the authentication manager 124 determines whether an account creation endpoint 138 (FIG. 1) is defined. If no account creation endpoint 138 is defined, the authentication manager 124 moves to box 609.

Then, in box 609, the authentication manager 124 uses form filling to create the account on the network site 140. User input may be necessary to submit the form in some embodiments, or the account creation request may be submitted automatically. If the account creation request results in failure, the authentication manager 124 may return to box 606 or leave the account creation up to the user. Next, in box 612, the authentication manager 124 stores account parameters in one or more of account data 130, 160, 163. The control flow of the authentication manager 124 then stops.

If in box 618, the authentication manager 124 determines that an account creation endpoint 138 has been defined, the authentication manager 124 proceeds to box 621 and uses the account creation endpoint 138 to create an account on the site. Next, in box 612, the authentication manager 124 stores account parameters in one or more of account data 130, 160, 163. The authentication manager 124 then ends.

Figure 7:
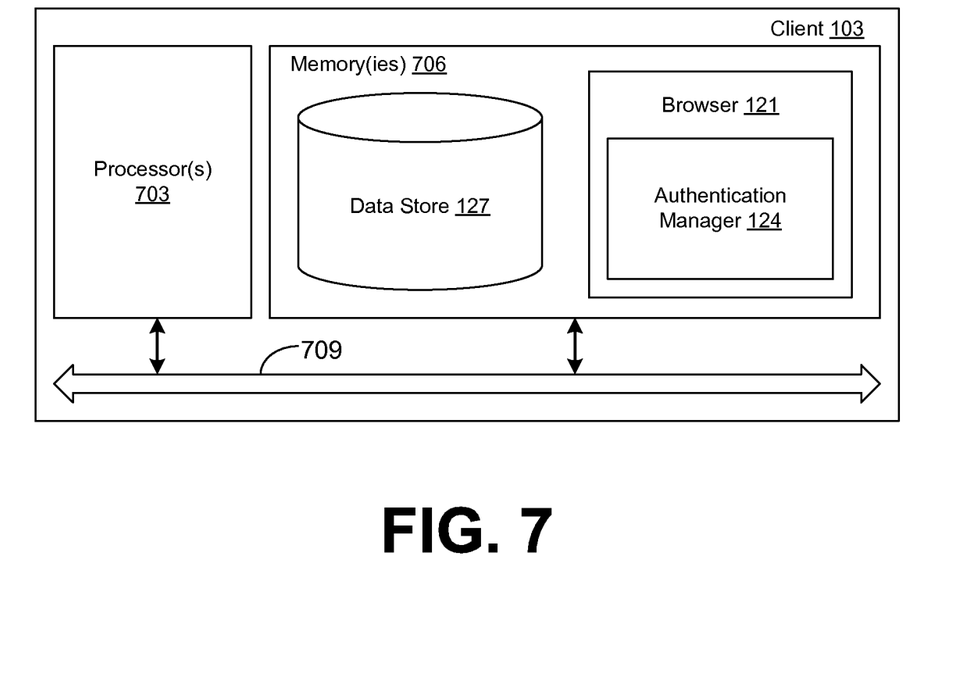
FIG. 7 is a schematic block diagram that provides one example illustration of a client employed in the networked environment of FIG. 1 according to various embodiments of the present disclosure.

Referring next to FIG. 7, shown is a schematic block diagram of the client 103 (FIG. 1) according to one embodiment of the present disclosure. The client 103 includes a processor circuit, for example, having a processor 703 and a memory 706, both of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a browser 121 (FIG. 1), authentication manager 124 (FIG. 1), and potentially other applications. Also stored in the memory 706 may be a data store 127 (FIG. 1) and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Java Script, Perl, Python, Ruby, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors and the memory 706 may represent multiple memories that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the browser 121, authentication manager 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show the functionality and operation of an implementation of portions of the authentication manager 124. If embodied in software, each block may represent a module, segment, or portion of code that comprises program instructions to implement the specified logical function(s). The program instructions may be embodied in the form of source code that comprises human-readable statements written in a programming language, or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the browser 121 and the authentication manager 124, that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an authentication manager executable via a client computing device, wherein when executed the authentication manager causes the client computing device to at least:
   in response to receiving data encoding a secure certificate from a network site, perform a trusted certificate validation on the secure certificate;
   perform a reverse domain name system (DNS) lookup on an internet protocol (IP) address associated with the network site;
   perform a comparison between a domain name resulting from the reverse DNS lookup and a stored domain name, the stored domain name being previously received from a trusted certificate and stored in a data store accessible to the client computing device; and
   automatically send data encoding a security credential to the network site based at least in part on the comparison when the trusted certificate validation is successful.

2. The non-transitory computer-readable medium of claim 1, wherein when executed the authentication manager further causes the client computing device to at least that automatically generate the security credential according to a security credential specification.

3. The non-transitory computer-readable medium of claim 1, wherein when executed the authentication manager further causes the client computing device to at least refrain from automatically sending the data encoding the security credential to the network site when the trusted certificate validation is unsuccessful.

4. The non-transitory computer-readable medium of claim 1, wherein when executed the authentication manager further causes the client computing device to at least determine whether the secure certificate currently provided by the network site matches the trusted certificate previously provided by the network site.

5. A system, comprising:
   a client computing device; and
   an authentication manager executable in the client computing device, wherein when executed the authentication manager causes the client computing device to at least:
      in response to receiving data encoding a secure certificate from a network site, perform a certificate validation on the secure certificate;
      perform a reverse domain name system (DNS) lookup on an internet protocol (IP) address associated with the network site;
      perform a comparison between a domain name resulting from the reverse DNS lookup and a stored domain name, the stored domain name being previously received from a trusted certificate and stored in a data store accessible to the client computing device; and
      automatically send data encoding a security credential to the network site based at least in part on the comparison in response to determining that the certificate validation is successful.

6. The system of claim 5, wherein when executed the authentication manager further causes the client computing device to at least reauthenticate a user at the client computing device in response to determining that the certificate validation is unsuccessful.

7. The system of claim 5, wherein when executed the authentication manager further causes the client computing device to at least automatically send the data encoding the security credential to the network site further based at least in part on comparing a stored uniform resource locator associated with the network site with a content of a browser address bar that is rendering a network page of the network site.

8. The system of claim 5, wherein when executed the authentication manager further causes the client computing device to at least automatically send the data encoding the security credential to the network site further based at least in part on comparing the stored domain name with a content of a protocol header sent by the network site.

9. The system of claim 5, wherein when executed the authentication manager further causes the client computing device to at least:
compare the secure certificate with the trusted certificate from the network site in performing the certificate validation, the trusted certificate being stored upon the client computing device.

10. The system of claim 9, wherein when executed the authentication manager further causes the client computing device to at least compare a domain name of the secure certificate with the stored domain name.

11. The system of claim 5, wherein when executed the authentication manager further causes the client computing device to at least:
in response to receiving a configuration file including a security credential specification from the network site, extract a maximum credential length and a character set from the security credential specification; and
wherein the security credential is automatically generated based at least in part on the maximum credential length and the character set allowed by the security credential specification.

12. The system of claim 5, wherein the stored domain name is stored in association with the security credential.

13. A method, comprising:
receiving, via an authentication manager executed by a client, data encoding a certificate from a network site;
performing, via the authentication manager executed by the client, a validation upon the certificate;
performing, via the authentication manager executed by the client, a reverse domain name system (DNS) lookup on an internet protocol (IP) address associated with the network site;
performing, via the authentication manager executed by the client, a comparison between a domain name resulting from the reverse DNS lookup and a stored domain name, the stored domain name being previously received from a trusted certificate and stored in a data store accessible to the client; and
in response to determining that the validation is successful, automatically sending, via the authentication manager executed by the client, data encoding a security credential to the network site based at least in part on the comparison.

14. The method of claim 13, further comprising automatically generating, via the authentication manager executed by the client, the security credential.

15. The method of claim 14, further comprising:
receiving, via the authentication manager executed by the client, a configuration file including a security credential specification from the network site;
extracting, via the authentication manager executed by the client, a maximum credential length and a character set from the security credential specification; and
wherein the security credential is automatically generated based at least in part on the maximum credential length and the character set allowed by the security credential specification.

16. The method of claim 13, further comprising, in response to determining that the validation is unsuccessful, refraining from automatically sending, via the authentication manager executed by the client, the data encoding the security credential to the network site.

17. The method of claim 13, further comprising determining, via the authentication manager executed by the client, whether a user at the client has provided a correct master security credential, wherein the data encoding the security credential is automatically sent further based at least in part on determining that the user has provided the correct master security credential.

18. The method of claim 13, further comprising determining, via the authentication manager executed by the client, whether a particular portable data store is present in the client, the particular portable data store being configured to store the security credential, wherein the data encoding the security credential is automatically sent further based at least in part on determining that the particular portable data store is present in the client.

19. The method of claim 13, further comprising receiving, via the authentication manager executed by the client, the security credential from a portable data store coupled to the client.

20. The method of claim 13, further comprising automatically creating, via the authentication manager executed by the client, a user account with the network site, the security credential providing access to a resource of the network site associated with the user account.

* * * * *